United States Patent [19]

Addleman et al.

[11] Patent Number: 4,705,401
[45] Date of Patent: Nov. 10, 1987

[54] RAPID THREE-DIMENSIONAL SURFACE DIGITIZER

[75] Inventors: David A. Addleman, Pacific Grove; Lloyd A. Addleman, Big Sur, both of Calif.

[73] Assignee: Cyberware Laboratory Inc., Pacific Grove, Calif.

[21] Appl. No.: 764,302

[22] Filed: Aug. 12, 1985

[51] Int. Cl.$^4$ .............................................. G01B 11/24
[52] U.S. Cl. ...................................... 356/376; 358/107
[58] Field of Search ........................... 356/1, 375, 376; 358/107

[56] References Cited

U.S. PATENT DOCUMENTS

| | | | |
|---|---|---|---|
| 3,187,185 | 6/1965 | Milnes | 358/107 |
| 3,218,389 | 11/1965 | Reed | 358/107 |
| 3,980,812 | 9/1976 | Grosskopf et al. | 358/107 |
| 4,105,925 | 8/1978 | Rossol et al. | 356/376 |
| 4,529,305 | 7/1985 | Welford et al. | 356/376 |
| 4,573,073 | 2/1986 | Corby, Jr. | 358/107 |

FOREIGN PATENT DOCUMENTS

| | | | |
|---|---|---|---|
| 2519138 | 7/1983 | France | 356/375 |
| 1332892 | 10/1973 | United Kingdom | 358/107 |

OTHER PUBLICATIONS

Matushita et al., *Mem. Fac. Eng. Osaka City Univ.*, V. 21, p. 107, Dec. 1980.

*Primary Examiner*—F. L. Evans
*Attorney, Agent, or Firm*—Paul B. Fihe

[57] ABSTRACT

The invention is a method and apparatus for automatic mensuration of three-dimensional surfaces. The surface is sensed via non-contact optical triangulation means and the optically produced image measured by electronic means. The electronic measurements are encoded as binary data and passed to a digital computer for storage, analysis and other functions. The invention is significant because of the speed and relative simplicity of the method and a provision for alleviating shadowing from large surface irregularities. The apparatus has no moving parts, excepting a mechanism to provide for movement of the apparatus relative to the surface so as to progressively view the entire surface. This invention projects two or more planes of light which intersect the surface at known angles, producing illuminated lines. Said lines are viewed by a video type camera placed at a known angle away from the planes so that displacements in the line may be sensed. Electronic circuits detect and measure points on the line and transfer the data to a digital computer.

5 Claims, 5 Drawing Figures

RAPID THREE-DIMENSIONAL SURFACE DIGITIZER

BACKGROUND OF THE INVENTION

1. Field of the Invention

This invention relates to non-contact surface mensuration methods and apparatus which provide data to digital computers and more particularly apparatus capable of high data rates so that movement of the surface, such as occurs with live subjects, can be accommodated.

2. The Prior Art

Surface mensuration apparatus have been limited to use on inanimate subjects because of methods that are inherently slow. Examples are U.S. Pat. Nos. 4,089,608 and 4,373,804 which use mechanical scanning or mechanical error correction. To make a high resolution measurement of the surface of a living subject, such as the human head, measurement rates greater than 10,000 points per second are required. At these high rates image data can be collected before movement of the subject causes excessive distortion in the image.

A second problem with optical non-contact apparatus is shadowing of the light beam or obstruction of the sensor's view by features of the subject surface. U.S. Pat. No. 4,089,608 is an example which has this limitation.

SUMMARY OF THE INVENTION

It is an object of the present invention to minimize the time required to collect the image data.

It is another object of the present invention to provide a geometry and signal processing method which ameliorates the shadowing problems of complex surfaces.

Other objects and advantages of the present invention will become apparent as the description proceeds.

The invention provides one or more thin planes of light which illuminate the subject providing contour lines on the surface of the subject. The contour lines are viewed from a point an acute angle away from the light planes by a scanning optical sensor, for example a video camera. Part of the apparatus provides for moving the subject relative to the light projection and sensing assembly.

The coordinates of any point on the subject surface can be derived from the image of the contour curve on the sensor and the position of the subject surface relative to the light projection and sensing assembly.

The scanning sensor detects points along the contour curve and generates digital data representing the position of these points on the surface of sensor. The data along with indexing data are stored sequentially in a computer's memory.

The contour curves from multiple light planes can be simultaneously imaged on the sensor surface for simultaneous scanning. To minimize the data volume which is stored during the exposure of the subject, only one coordinate must be stored. The other coordinates of the point may be derived from the relative positions of the data in the memory.

A method is provided for accurate measurement of the contour image position on the sensor by use of an amplitude insensitive detector along with digital counting and synchronization circuits.

Each light plane can measure the subject surface from a different angle and therefore ameliorate the shadowing problem encountered if only a single light plane is used. The digital computer receives data from all contours and may choose among them to reduce the shadows.

DESCRIPTION OF THE PREFERRED EMBODIMENT

Figure 1:
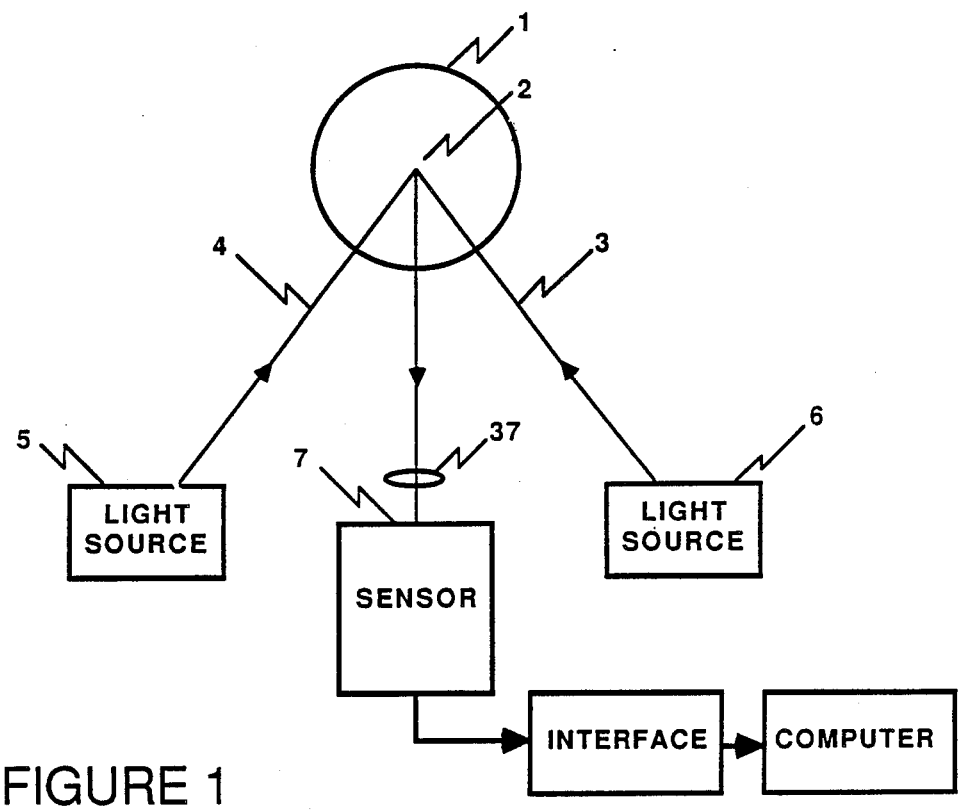
FIG. 1 illustrates the geometry of the apparatus layout.

FIG. 1 shows the measuring geometry. Data will be collected in cylindrical coordinate form. A rotating table 1 upon which the subject to be imaged is placed has axis of rotation 2. Precisely intersecting this axis are two thin planes of light 3 and 4 perpendicular to the drawing plane. The angles between light sources and camera 7 are small to allow measurement into narrow depressions of the subject surface. Light sources 5 and 6 can be incandescent or laser. A video camera sensor 7 views both contour lines generated by the intersections of the light planes and the subject. The center of the camera field of view is aligned on the table axis 2.

Figure 2:
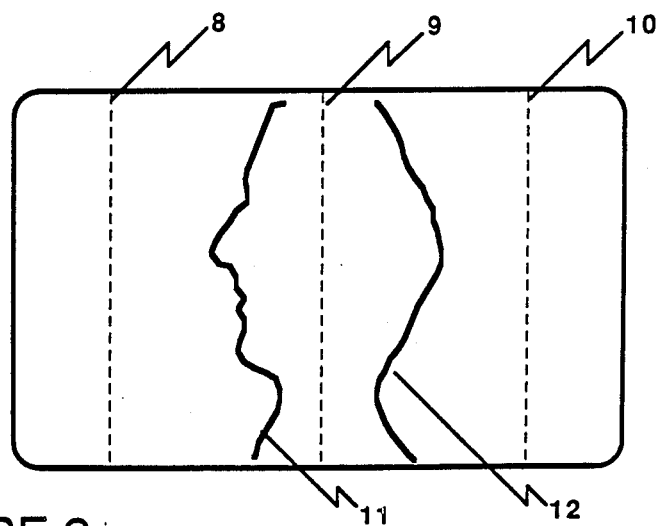
FIG. 2 represents the image plane of the video camera sensor 7 of FIG. 1.

FIG. 2 is a representation of the image field of the camera. The horizontal scan point begins at the upper left boundary 8 and proceeds through the center of the field 9 to the right boundary 10 retraces and continues downward. Images of the two subject contours are at 11 and 12.

Figure 3:
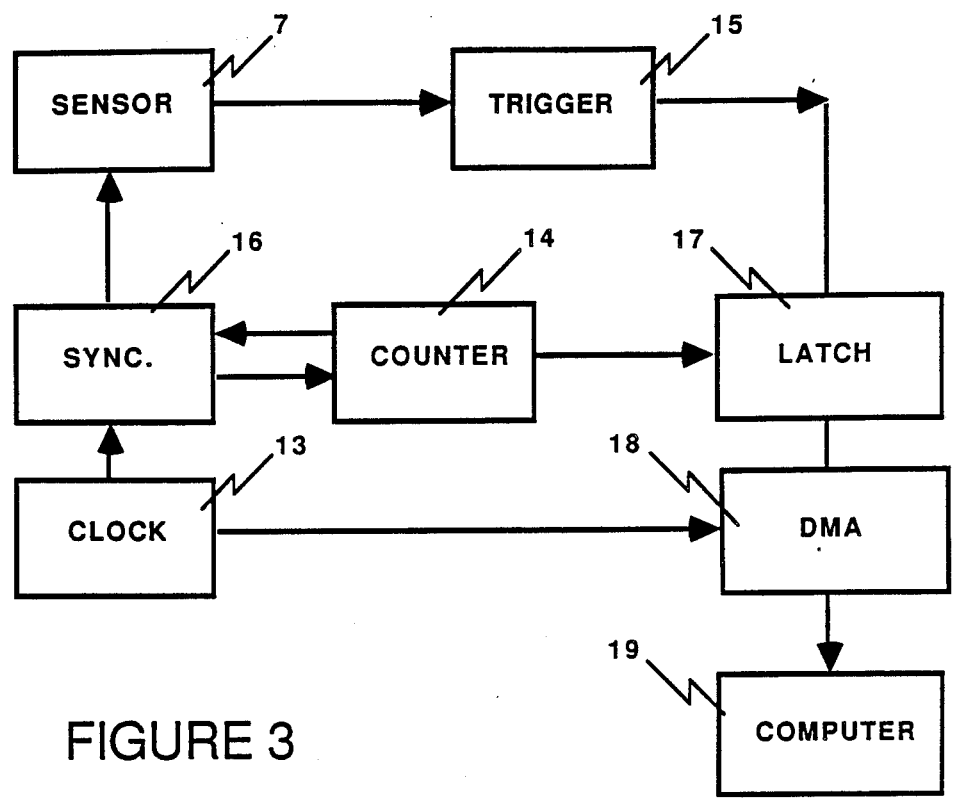
FIG. 3 is a block diagram of the electronic signal processing and synchronization circuits.

The block diagram of FIG. 3 illustrates the electronic circuitry for controlling the video camera sensor 7 and processing the camera output. All operations are timed by a clock 13. During each horizontal sweep an up-down counter 14 counts down from maximum at the beginning of the sweep to zero at the center or table axis image position and back up to maximum at the horizontal sweep termination. A coincidence between the counter value and a video response from a contour line yields a counter value proportional to the radius of that surface point on the subject. The most straightforward scanning system avoids the commonly used interlaced video scanning giving a single video field per frame. With this single field the point coordinate along the axis of subject rotation is proportional to the vertical deflection or vertical line count. The remaining coordinate is directly related to the rotational position of the subject and can be derived from the sequential frame position. It is not necessary to synchronize the table rotation as long as its velocity is constant and the precise start and end of one revolution is known.

The video signal outputs of the video camera sensor have a wide range of amplitude and are frequently asymmetrical due to variations in the reflectivity and slope of the subject surface. If a high accuracy measurement of radius is to be achieved special treatmemt of the camera video is required. For this function an amplitude insensitive trigger circuit FIG. 3, item 15 is used.

Figure 4:
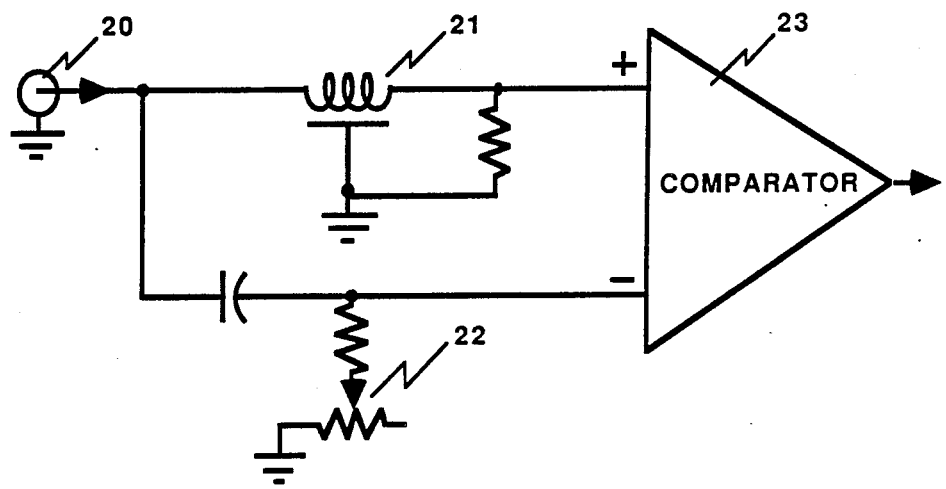
FIG. 4 is a schematic representation of an amplitude insensitive trigger circuit.
Figure 5:
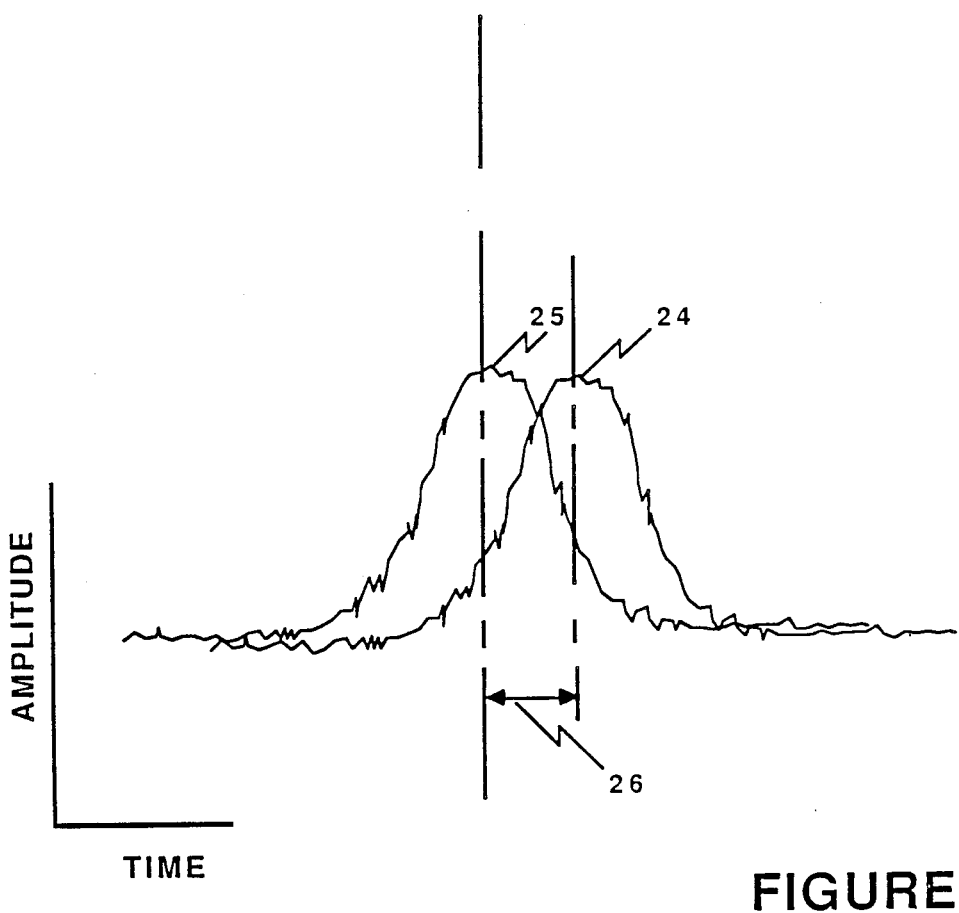
FIG. 5 represents typical input waveforms associated with the trigger circuit of FIG. 4.

FIG. 4 illustrates the amplitude insensitive trigger circuit. The camera video 20 is divided into two equal amplitude parts one of which is delayed 21 and then applied to one input of a high speed voltage comparator 23. The sum of the undelayed video and an adjustable bias signal 22 is applied to the other input. FIG. 5 illustrates the relationship between the two signals. The comparator will provide an output whenever the amplitude of the delayed signal 24 exceeds that of the undelayed signal 25. The comparator output is one-half of the delay time 26 later than the true value. The bias adjustment adjusts the two signals relative to one another so that sensitivity can be set above system noise.

Returning to FIG. 3, the output of the amplitude insensitive trigger 15 enables the latch 17 causing the counter 14 value to be stored.

To maximize data handling speed the radius data is packed into the word size of the computer. This word of data is then passed to a direct memory access circuit 18 which stores it in the computer random access memory.

The process continues while the subject rotates one full turn. Frame synchronization data can be stored in the computer memory by reserving the highest value radius reading for that purpose, and storing it immediately preceding or following the data for each frame.

Returning to FIG. 1, an anamorphic lens 37 can be used to magnify the contour image along the horizontal axis increasing the resolution for the radius coordinate.

The details of the present invention are given by way of example and are not intended to limit the spirit or scope of the invention as set forth in the claims.

What is claimed is:

1. An apparatus for performing high speed noncontacting mensuration of 3-dimensional surfaces comprising:

a means for illuminating said surface with one or more planes of light intersecting said surface and producing contour lines;

a means for moving said surface relative to said planes of light;

a means for sensing points on said contour lines reflected from said surface;

a means for accurately determining the position of said points over a wide dynamic range of reflected light intensity and beam spreading, whereby a wide variety of surfaces can be measured without adjusting sensor sensitivity or lens aperture; said means including a circuit wherein the sensor output is divided into two parts, the first being delayed before connection to one input of an amplitude comparator, the second connected to the remaining input of the comparator resulting in an amplitude and distortion insensitive timing detector;

a means for storing the point position data;

a means to provide synchronization for all parts of the apparatus.

2. An apparatus as defined in claim 1 wherein said surface movement is a rotation about an axis.

3. An apparatus as defined in claim 1 wherein said sensing means comprises a video camera with its field of view divided so as to observe multiple contour lines simultaneously.

4. An apparatus as defined in claim 1 wherein the means for storing the point position data functions in the order sensed.

5. An apparatus as defined in claim 1 wherein the scanning means includes a sensor with an anamorphic lens to increase the resolution of the surface coordinate lying in the plane of light and toward said sensor.

* * * * *